United States Patent [19]
Trimmer et al.

[11] Patent Number: 5,821,595
[45] Date of Patent: Oct. 13, 1998

[54] CARRIER STRUCTURE FOR TRANSDUCERS

[75] Inventors: William S. Trimmer, Belle Mead; Donald P. Weiss, Newark, both of N.J.; Donald J. Summers, Northford; Stephen A. Raccio, Oxford, both of Conn.

[73] Assignee: Dresser Industries, Inc., Dallas, Tex.

[21] Appl. No.: 855,091

[22] Filed: May 13, 1997

Related U.S. Application Data

[60] Provisional application No. 60/017,751 May 15, 1996.

[51] Int. Cl.⁶ .......................... H01L 29/82; H01L 23/48; H01L 23/52
[52] U.S. Cl. ..................... 257/417; 257/419; 257/688; 257/692; 257/696
[58] Field of Search ..................... 257/417, 419, 257/688, 692, 696, 784

[56] References Cited

U.S. PATENT DOCUMENTS

| | | |
|---|---|---|
| 3,329,023 | 7/1967 | Kurtz et al. . |
| 3,654,579 | 4/1972 | Kurtz et al. . |
| 3,772,628 | 11/1973 | Underwood et al. . |
| 4,333,349 | 6/1982 | Mallon et al. . |
| 4,467,656 | 8/1984 | Mallon et al. . |
| 4,476,726 | 10/1984 | Kurtz et al. . |
| 4,481,497 | 11/1984 | Kurtz et al. . |
| 4,510,671 | 4/1985 | Kurtz et al. . |
| 4,530,244 | 7/1985 | Starr . |
| 4,672,354 | 6/1987 | Kurtz et al. . |
| 4,739,298 | 4/1988 | Kurtz et al. . |
| 4,814,845 | 3/1989 | Kurtz . |
| 4,814,856 | 3/1989 | Kurtz et al. . |
| 4,843,454 | 6/1989 | Kato et al. ................. 257/419 |
| 5,002,901 | 3/1991 | Kurtz et al. . |
| 5,126,813 | 6/1992 | Takahashi et al. ........ 257/417 |
| 5,156,052 | 10/1992 | Johnson et al. . |
| 5,170,237 | 12/1992 | Tsuda et al. . |
| 5,177,579 | 1/1993 | Jerman . |
| 5,186,055 | 2/1993 | Kovacich et al. ......... 73/727 |
| 5,459,351 | 10/1995 | Bender ...................... 257/417 |
| 5,604,363 | 2/1997 | Ichihashi .................... 257/274 |
| 5,629,538 | 5/1997 | Lipphardt et al. .......... 257/254 |

*Primary Examiner*—Mashid D. Saadat
*Assistant Examiner*—Allan R. Wilson
*Attorney, Agent, or Firm*—Haynes and Boone, L.L.P.

[57] ABSTRACT

A carrier structure for transducers. The semiconductor carrier structure mounts as a single unit to a force-impacted substrate and includes multiple piezoelectric elements integrally formed with the carrier structure, such that the elements are located in a space defining a window of the structure while maintaining their electrical contact and their precise position relative to the structure by use of thin-film, electrically conductive, metallic flexures attached to both the structure and the elements.

20 Claims, 3 Drawing Sheets

CARRIER STRUCTURE FOR TRANSDUCERS

CROSS-REFERENCE

This application claims the benefit of U.S. Provisional Application No. 60/017,751 filed May 15, 1996.

BACKGROUND OF THE INVENTION

The invention relates generally to semiconductor transducers and, more particularly, to such transducer assemblies which employ a single block semiconductor carrier structure for supporting semiconductor piezoresistive elements (e.g., strain gages).

Semiconductive transducers are widely used in automotive, biomedical and a variety of other applications because of their relatively small dimensions, reliability and high signal output relative to other devices. In performing the transducer function one or more piezoresistive semiconductor elements are utilized in which the resistance thereof varies according to the intensity or magnitude of an applied force upon an associated diaphragm to which the elements are mechanically coupled (bonded). The diaphragm to which the force is applied is typically a metal or semiconductor membrane-like substrate upon which the piezoresistive elements are dielectrically mounted. A force applied to the diaphragm deflects the diaphragm and hence causes the associated piezoresistive element to vary resistance in accordance with the deflection. The force being measured is transferred to the piezoresistive element, which is strain responsive, causing the element to expand or compress, thereby producing a change in the electrical resistance of the element. The piezoresistive elements are typically arranged in a Wheatstone bridge circuit with one to four of the bridge legs being active. Other circuit configurations are also possible.

A desire is to continue improving the characteristics of transducers of the foregoing type so that devices may be manufactured that are relatively small, sensitive and which produce a relatively large resistance in a relatively small area. The devices should also exhibit a linear operation and small deviations in sensitivity and null offset over a wide range of temperatures, and likewise be relatively low in manufacturing cost.

A problem in achieving these improved characteristics and cost efficiencies, however, relates to the manner in which prior art transducers are manufactured and assembled. Prior art transducer assemblies require multiple piezoelectric elements, i.e., "gages," to be manufactured as discrete elements. Manufacturing process and material variations contribute to a lack of uniformity of these elements. The elements must then be separately welded or bonded to the diaphragm at precise locations on the diaphragm. Hair-thin contact leads then extend from the gages to associated electrical circuitry. A considerable amount of labor is required to individually wire and mount the gages on the diaphragm. Inaccuracies tend to result in placement of the gages on the correct locations of the diaphragm. The gages must subsequently be electrically normalized based upon their mechanical deviation and their deviation from optimum bonding position on the diaphragm, and it is therefore difficult to achieve consistent results from one transducer assembly to the next. Furthermore, the delicacy of the contact lead connections to the gages tends to result in breakage and hence defects.

More recent transducer structures employ ceramic substrates in connection with the semiconductor piezoelectric elements, i.e., gages, such that the ceramic structure containing the gages also acts as the diaphragm. Also, since transducer assemblies typically require compensating and normalizing resistors and interconnecting electronic circuits, the ceramic substrate further incorporates these additional circuit elements on top of the transducer structure by conventional thin and/or thick film techniques. The resultant hybrid transducer possesses improved characteristics in regard to high voltage and high pressure applications while at the same time reducing manufacturing costs. However, the hybrid transducer suffers from relatively low sensitivity and is not well suited for use in connection with larger diaphragm applications. For example, heat from the normalizing resistors and interconnecting circuitry interferes with consistency in sensing of the gages. Likewise, the gages do not move or "float" independently of each other because they are part of the same substrate, and accordingly pressure variations in different parts of the diaphragm are not accurately sensed.

Therefore, what is needed is a transducer assembly that is relatively sensitive and stable yet which can be fabricated with improved efficiency and reliability.

SUMMARY OF THE INVENTION

The present invention, accordingly, provides a transducer assembly having a carrier structure that integrally supports multiple piezoelectric elements for mounting as a single unit to a diaphragm or other force-impacted substrate. The integrally formed piezoelectric elements, i.e., gages, are carved out and separated from the carrier structure in a space defining a window of the structure while maintaining their electrical contact and their precise position relative to the structure by use of thin-film, electrically conductive, metallic flexures attached to both the structure and the gages. The carrier structure, together with the attached, but mechanically decoupled, gages maintains the precise, relative position of the gages through the manufacturing process. The transducer assembly is thus well suited for precise registration and mounting to a substrate by an automated process.

In one embodiment, a carrier structure for transducers mounts as a single unit to a force-impacted substrate and includes multiple piezoelectric elements integrally formed with the carrier structure, such that the elements are located in a space defining a window of the structure while maintaining their electrical contact and their precise position relative to the structure by use of thin-film, electrically conductive, metallic flexures attached to both the structure and the elements.

A technical advantage achieved with the invention is improved quality control and reduced manufacturing cost of the transducer assembly. Accuracy is improved in the assembly and placement of the gages on the substrate at, for example, points of maximum and minimum stress in the substrate, thereby enabling higher and balanced electrical output from a bridge circuit of the gages to be achieved. Further, precision placement of the gages at optimal sites on the substrate achieved with the invention allows for use of smaller substrates which results in lower mass and lower cost of products employing the invention.

Another technical advantage achieved is that the transducer assembly minimizes hand labor and reduces the mass and unreliability of interconnect wires for improved shock resistance. In assembly, it is not necessary to handle and mount individual gages, allowing for use of automated handling and assembly methods for better quality control and reduced manufacturing cost.

A further advantage of the invention is that the metal thin film that supports the gages within the carrier structure window, by mechanically decoupling the gages in the vertical axis while still providing enough lateral support to ensure precision placement of the gages, improves the electrical performance of the transducer assembly.

Yet another advantage of the invention is that by integrating the normalizing resistors and other circuitry in the carrier structure in a plane elevated from the gages as well as in the same plane as the active gages, the performance of measuring devices employing the transducer assembly is improved since certain gages may, while others on the same structure may not, be mechanically and thermally isolated from other active and passive circuits which could generate heat, which is a cause of inaccurate measurements.

An added advantage is that the gages are formed from the same part of the silicon wafer and therefore have uniform mechanical and electrical characteristics. As a result, this reduces the requirement for added compensation to balance the gage characteristics.

DETAILED DESCRIPTION OF THE PREFERRED EMBODIMENT

Figure 1:
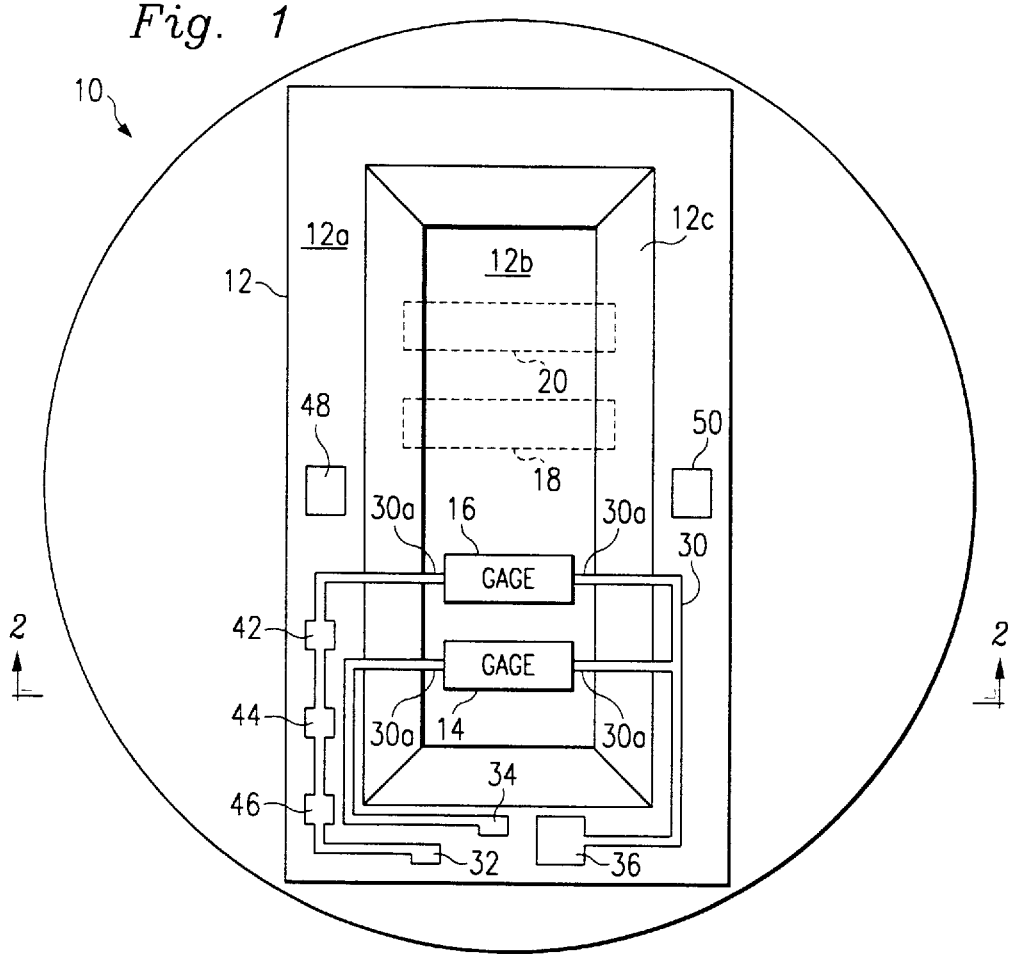
FIG. 1 is a top plan view of an embodiment of a transducer assembly employing a carrier structure according to the present invention.
Figure 2:
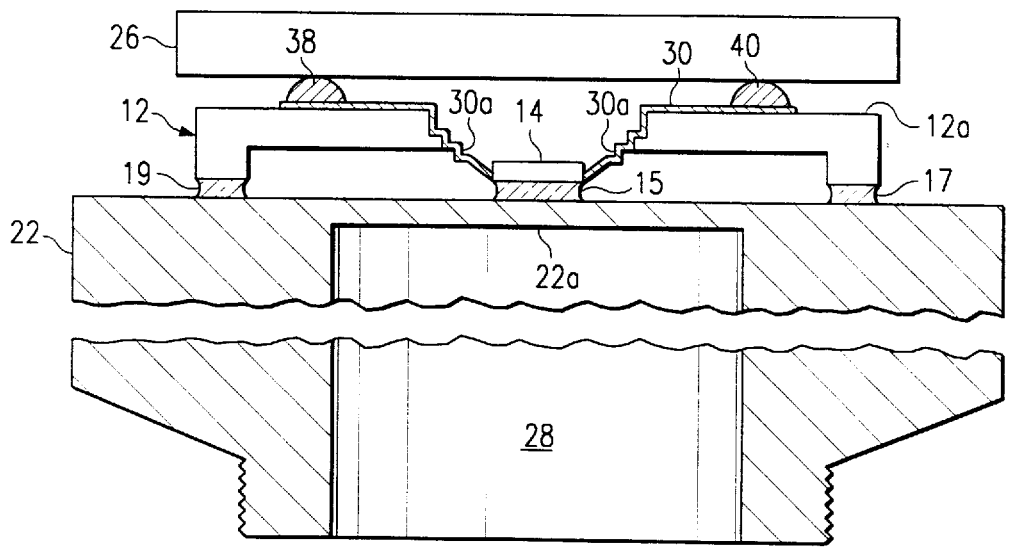
FIG. 2 is an enlarged, partial cross-sectional view of an embodiment of the assembly taken through line 2—2 of FIG. 1.

In FIGS. 1 and 2, the reference numeral 10 refers to a transducer assembly embodying features of the present invention. The assembly 10 includes a semiconductor carrier structure 12 having integrally-formed piezoelectric elements 14, 16, 18 and 20 (e.g., strain gages), a diaphragm housing 22 serving as a substrate for the carrier structure, and an electronics board 26. Carrier 12 is preferably bonded to diaphragm housing 22 by a glass bond 17, 19. Diaphragm housing 22 includes an active region 22a and a fluid chamber 28.

In the present embodiment, the active diaphragm region 22a of diaphragm housing 22, and fluid chamber 28, are shown as being constructed from one piece of material. While not shown, it is understood that this device may also be made up of several components in order to produce the same end result. It is also understood that fluid, e.g., air, oil, water or the like, entering or leaving the bottom portion of the chamber 28 as shown in FIG. 2, imparts a measurable force to active region 22a of the diaphragm housing 22. This force causes the active region 22a to be deflected, and hence causes the elements 14–20 that are bonded to the active region 22a by a glass bond 15, to expand or compress, thereby producing a change in the resistance of the elements which is then measured by conventional circuitry (not shown), some or all of which may be located on the carrier structure 12, the electronics board 26, and the diaphragm housing 22.

The carrier structure 12 may be comprised of silicon or a semiconductor material, such as a monolithic or built up laminate including silicon or silicon and glass and dielectric material such as oxides, nitrides, polymers and the like, intercalated to create a block of bulk material. The block may be fabricated using a single crystal of silicon, gallium, germanium or other semiconductor, for example. The structure 12 is formed using standard three-dimensional deep photolithographic and other etching techniques. As will be described further below, etching is performed on a block of material forming the structure 12 to define the elements 14–20 such that the elements are carved out and separated from the structure, but have flexible interconnecting electrical paths connecting the elements to the structure. Techniques utilized include, for example, wet etching of the block where isotropic or anisotropic etchants such as KOH or TMAH are used, and dry etching where reactive ion etching is used. While not shown, it is also contemplated that the block forming the structure 12 may comprise multiple layers of silicon and silicon on insulator (SOI) material. For example, two or more silicon wafers are bonded together with an intervening insulator of material such as SiO2. In such instance one wafer may be etched to form the elements 14–20 while the other layer may be etched to form the supporting carrier portion of the structure 12. In some embodiments, the use of multiple laminants of silicon wafer material and SOI material enable the bonding of P-type and N-type layers so that both P-type and N-type elements (not specifically shown) can be fabricated in the same vertical plane or adjacent to one another in the same horizontal plane, or both simultaneously, as part of the carrier structure 12. It is then feasible to match the magnitude of the output performance of the P-type and N-type elements, which have opposite signs, and add them together to increase the output of a bridge circuit (not shown) by approximately a multiple of the number of elements included in the circuit.

In further reference to the embodiment of FIG. 1, the carrier structure 12 is fabricated as shown to define a peripheral elevated portion 12a that is etched to also define an opening, i.e., a window 12b. A sloped portion 12c defines a taper of the elevated portion 12a to the window 12b.

Figure 2A:
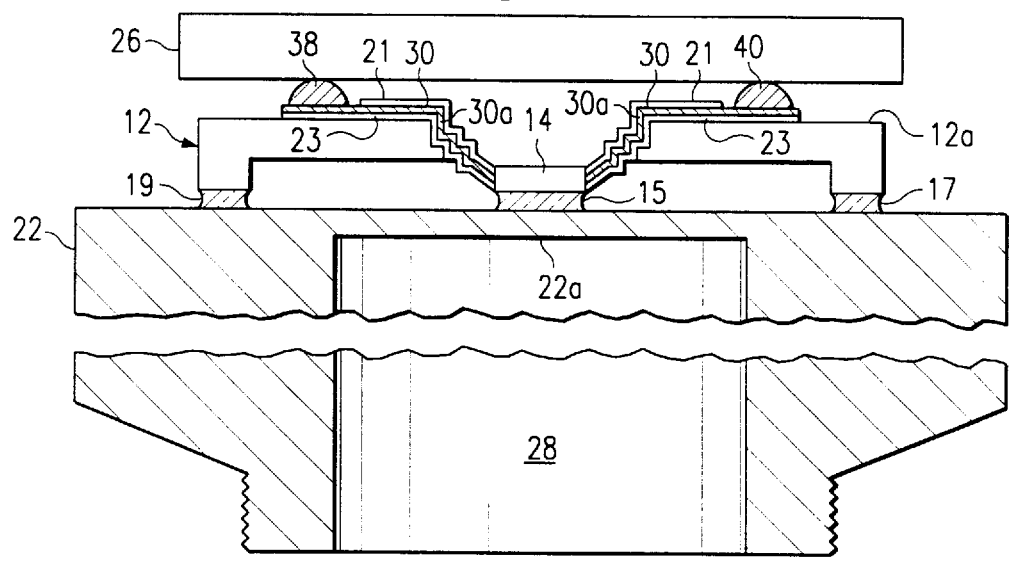
FIGS. 2a–d are cross-sectional views illustrating alternate embodiments of the carrier structure.

Conducting lands 30 are deposited and patterned on the carrier 12a (using shadow masking techniques, deep photolithography or synchrotron radiation photolithography, for example) for providing electrically conductive paths 30a to the elements 14 and 16, FIG. 1 While not shown, it is understood that similar lands are provided as electrically conductive paths for the elements 18 and 20. The lands 30 may be constructed of aluminum or any other conductive metal and further may be insulated by depositing insulating material thereon such as insulating layers 21, 23, FIG. 2a. These insulating layers 21, 23 are preferably deposited on both sides of lands 30 and flexures 30a to match or balance stress acting on the lands 30 and flexures 30a and reduce bending thereof. A suitable insulating material is silicon dioxide ($SiO_2$) or silicon nitride (SiN).

Metallic flexures 30a are portions of the lands 30 that support the elements 14, 16 within the window 12b. The flexures 30a are stepped, or "zigzagged," or otherwise configured in such a manner as to create a very low force, electrically conductive spring or flexure, to mechanically decouple the elements from the carrier structure 12. Thus the structure 12, together with the supported and attached, but mechanically decoupled, elements 14, 16 can maintain their precise, relative position to the diaphragm 22 during the manufacturing process. However, once manufacturing is completed and the elements 14, 16 are bonded (as described below) to the diaphragm 22, because the flexures 30a mechanically decouple the elements from the rest of the structure 12 the elements are able to more accurately and sensitively measure localized forces exerted on the diaphragm at the individual locations of the elements.

Output pads 32, 34, 36 are provided at the terminus (or other location) of the lands 30 for electrically connecting the structure 12 to external electronics. The pads 32–36 may employ solder bump technology where the height of the pads is altered to provide space, i.e., relief, between the structure 12 and external electronics such as the electronics board 26. As shown, conductive solder or bonding 38, 40 is shown to connect the lands 30 to the electronics (not shown) of the electronics board 26. While not shown, it is understood the electronics board 26 may include any type of electronic elements for use with the assembly 10, including normalizing resistors and interconnecting circuits, peripheral feature circuits and the like.

A series-resistance chain made up of resistors 42, 44, 46 (FIG. 1) is also included as part of the electrically conductive lands 30. In forming the resistors 42–46, it is understood that resistive trimming utilizing a laser or other tool may be performed to change the resistance values thereof. Similar techniques may be utilized on the lands 30 as well and on the elements 14–20 to change the dimensions of, or modify the resistance of, the elements.

Other circuits 48, 50, FIG. 1, also form part of the carrier structure 12 for integrating additional active signal conditioning and processing electronics with the structure 12, as part of the assembly 10. The other circuits 48, 50 may be formed integrally with the structure 12 by etching, masking and other processes or alternatively may be deposited on the structure.

As shown in FIGS. 1 and 2, the conductive lands 30, the resistors 42–46, and the other circuits 48, 50 are situated on the structure 12 on the elevated portion 12a so that they are in a different elevational plane than the piezoresistive elements 14–20. In this manner, elements 14–20 are not adversely affected by heat or electrical interference from the additional circuitry, thereby improving the performance of the assembly 10. The fact that the structure 12 itself is semiconductor material, as contrasted with an alumina based ceramic, further improves its thermal characteristics relative to the resistive and other electronics interfering with the piezoresistive elements 14–20.

In manufacturing of the transducer assembly 10, several efficiencies and improvements over other transducer arrangements are achieved. First, the design of the carrier structure 12 is determined so that the exact optimal location of the piezoelectric elements 14–20 relative to the diaphragm 22 is determined. Similarly, the preferred normalizing resistor, interconnecting land and other active signal conditioning circuitry arrangement is determined for the carrier structure 12. The carrier structure 12 may then be fabricated in mass production with consistency as to the foregoing preferences. The gages or elements 14–20 are formed from the same part of the silicon wafer and therefore have uniform electrical and mechanical characteristics. As a result, this reduces the requirement for added compensation to balance the gage characteristics.

In assembly, the structure 12 is placed over the appropriate location of the diaphragm 22 and is secured thereto. The structure and elements are secured by glass bonds 15, 17, 19 that may alternatively be anodic bonding, glass bonding, diffusion bonding or the like. It is appreciated that when multiple elements 14–20 are so bonded, accuracy is ensured because the elements are located in the correct locations on the structure 12 and labor is reduced because placement and bonding for each may occur simultaneously. Bonding may also be accomplished between the block of the structure 12 and the diaphragm 22 using other known bonding techniques.

Once the structure 12 is in place, the electronics block 26 is bonded to the structure at 38, 40 by aligning the conductive contact points of the block with those of the structure. In this manner, the remainder of the electronics contained in the block 26 and associated with the assembly 10 are quickly and accurately connected to the structure 12. It is thus apparent that both the mounting of the structure 12 to the diaphragm 22 and the mounting of the electronics block 26 to the structure 12 are readily capable of being performed by automated equipment, thereby reducing labor costs and improving the accuracy of the end product, i.e., the assembly 10.

Figure 2B:
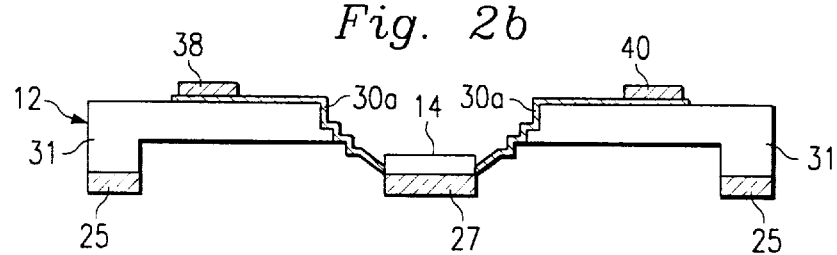

As an alternative, carrier member 12, FIG. 2b, may be provided with glass 25 on carrier feet 31 and glass 27 on strain gage 14. Thus, the manufacturing step of screening glass frit onto the diaphragm 22 is eliminated. Less bonding material is needed which improves the accuracy of the diaphragm deflection.

Figure 2C:
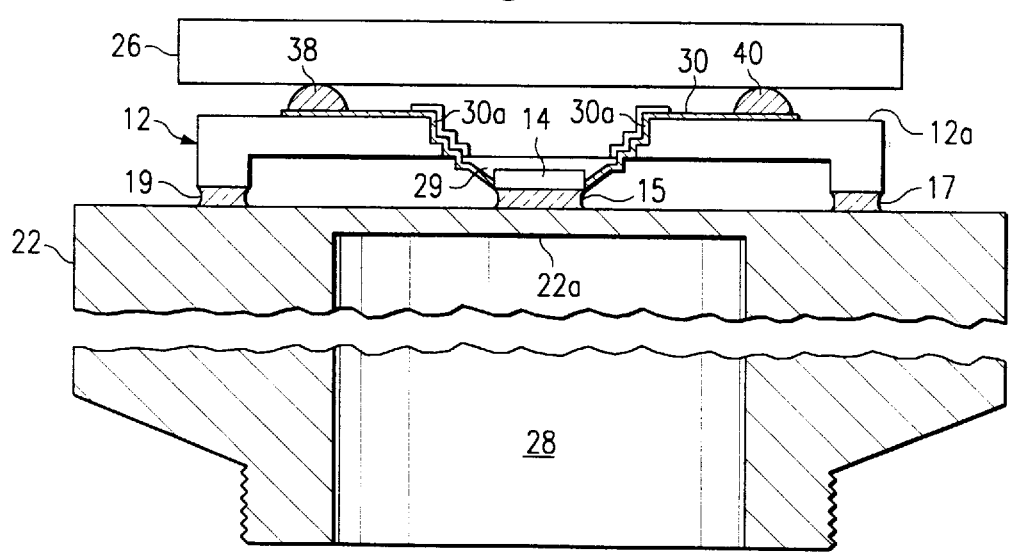

As another alternative, FIG. 2c if a wax-like or other material 29 is placed on flexures 30a, the wax material 29 functions to add mechanical strength to the flexures 30a during assembly. The wax material 29 can also provide added mechanical strength to the strain gage 14 and conductive lands 30 during the assembly process. Subsequently, the wax may be removed by heating or washing with a solvent.

Figure 2D:
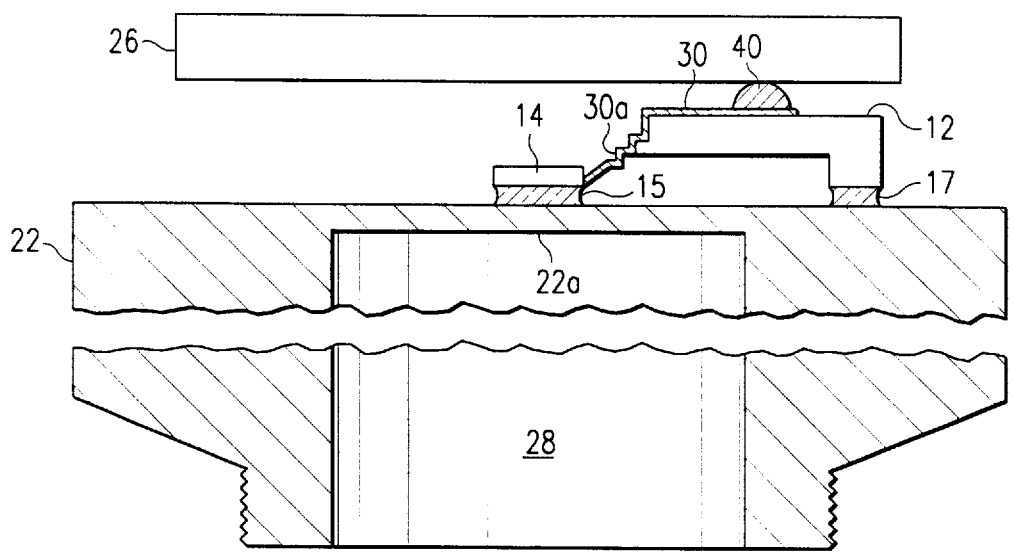

A further alternative, FIG. 2d, provides for a cantilever type of arrangement wherein the gage 14 is outwardly suspended from carrier 12, in outrigger fashion. This reduces, substantially by half, the size of the carrier 12 and thus reduces the cost of the assembly.

Figure 3:
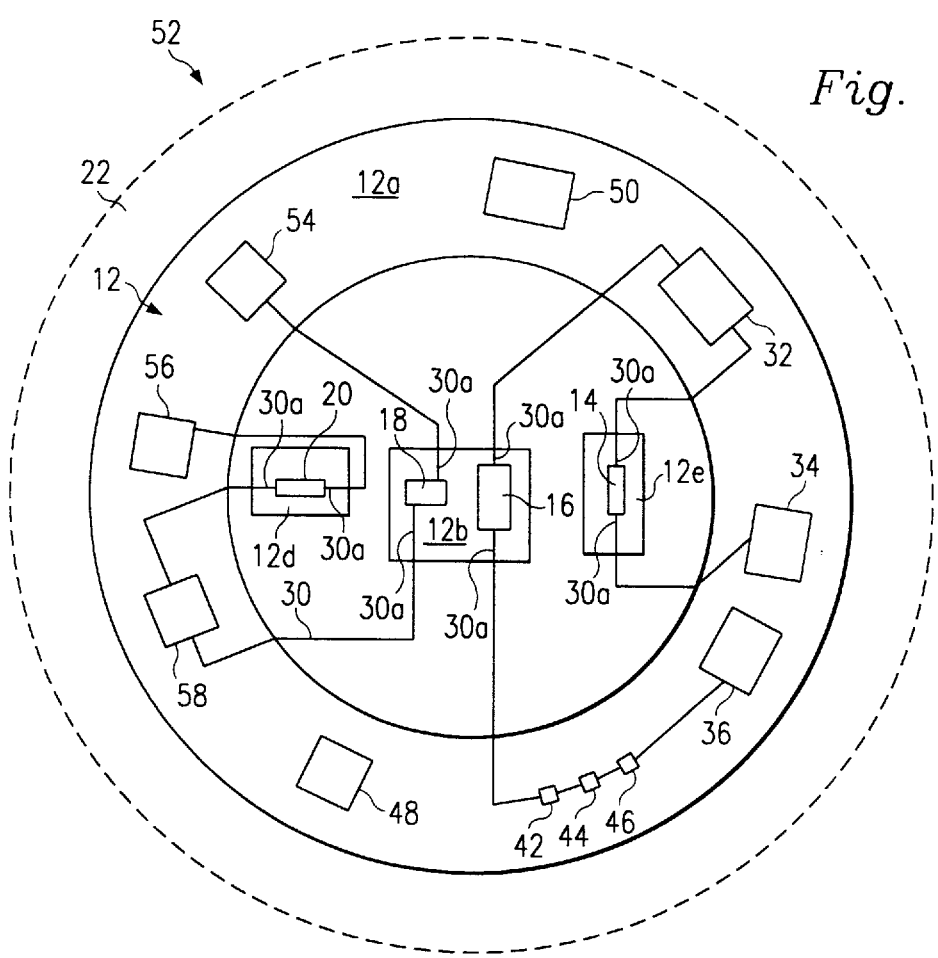
FIG. 3 is top plan view of another embodiment of a transducer assembly employing a carrier structure according to the present invention.

FIG. 3 shows an alternative embodiment illustrating a transducer assembly 52. Like components to those of the assembly 10, previously described, are given the same reference numerals as shown in FIGS. 1 and 2. The assembly 52 includes a carrier structure 12 which is round or irregular in shape instead of rectangular in shape. Further, instead of having a single opening or window 12b, the structure 12 also includes windows 12d and 12e for housing the elements 20 and 14, respectively.

The piezoelectric elements 14–20 are arranged in a Wheatstone bridge circuit with the orientation of different elements being perpendicular to one another for accurate sensing in all directions of flexure of the diaphragm 22. Additional output pads 54, 56, 58 are shown connected to the lands 30.

It is understood that appropriate normalizing circuitry such as resistors 42, 44, 46, while not shown, and active conditioning circuitry, may be integrally formed with the structure 12 and further that an electronics block 26 may be configured with the assembly 52.

As thus described, the invention enables improved quality control and reduced manufacturing cost for transducer assemblies. Accuracy is improved in the assembly and placement of the elements on the diaphragm substrate at the proper points is ensured. The precision placement capable with the invention further allows for use of smaller substrates which results in lower mass and lower cost of measurement products employing the invention. The transducer assembly minimizes hand labor and reduces the mass and unreliability of interconnect wires for improved shock resistance. Further, a valuable aspect of the invention is that the metal thin film flexure that supports the elements within the carrier structure window, by mechanically decoupling the gages while still providing enough support to ensure precision placement of the gages, improves the electrical performance of the transducer assembly. Also, by integrating the normalizing resistors and other circuitry in the carrier structure in a plane elevated from the piezoelectric elements, the performance of measuring devices employing the transducer assembly is improved since the elements are mechanically and thermally isolated from other active and passive circuits which could generate heat, which typically is a cause of inaccurate measurements. Because the gages or elements are formed from the same part of the wafer, they have uniform mechanical and electrical characteristics. As a result, this reduces the requirement for added compensation to balance the gage characteristics.

Although illustrative embodiments of the present invention have been shown and described, a latitude of modification, change and substitution is intended in the foregoing disclosure, and in certain instances, some features of the invention will be employed without a corresponding use of other features. For example, elements that are electrical device or circuit elements other than piezoresistive elements may be employed and the application may involve electrical circuit or electro-mechanical assemblies other than transducer assemblies. Accordingly, it is appropriate that the appended claims be construed broadly and in a manner consistent with the scope of the invention.

What is claimed is:

1. A transducer assembly comprising:
    a carrier structure for mounting as a single unit to a substrate, the carrier structure including an opening formed therein, a peripheral elevated portion, and a sloped portion between the elevated portion and the opening;
    at least one circuit element integrally formed with the carrier structure, such that the circuit element is located in the opening;
    a conducting land patterned on the carrier structure; and
    at least one conductive flexible member electrically interconnecting the conducting land and the circuit element, the flexible member being of a zigzag configuration to mechanically decouple the circuit element from the carrier structure.

2. The transducer assembly as defined in claim 1 wherein the at least one circuit element is positioned relative to the carrier structure in a plane separate from the plane of the carrier structure.

3. The transducer assembly as defined in claim 1 further comprising at least one other circuit forming part of the carrier structure, the other circuit being electrically connected to at least one circuit element.

4. The transducer assembly as defined in claim 3 wherein the carrier structure defines a horizontal plane and the at least one circuit element and the at least one other circuit are positioned relative to each other in separate horizontal planes.

5. The transducer assembly as defined in claim 1 wherein the substrate is a diaphragm housing supporting the circuit element, the carrier structure and substrate being interconnected by a bond.

6. The transducer assembly as defined in claim 5 wherein the circuit element is connected to the substrate by a bond.

7. The transducer assembly as defined in claim 5 wherein the carrier structure includes foot portions, the circuit element and the foot portions being connected to the substrate by a bond.

8. The transducer assembly as defined in claim 1 wherein the conducting land includes an insulating material deposited thereon.

9. The transducer assembly as defined in claim 1 wherein the conducting land and flexible member include insulating layers on opposite surfaces thereof.

10. The transducer assembly as defined in claim 1 wherein the flexible member is on the sloped portion.

11. A transducer assembly comprising:
    a carrier structure for mounting as a single unit to a substrate, the carrier structure including a window formed therein, a peripheral elevated portion, and a sloped portion between the elevated portion and the window;
    multiple piezoelectric elements integrally formed with the carrier structure, such that the piezoelectric elements are located in the window;
    conductive lands patterned on the carrier structure;
    conductive flexible members electrically interconnecting the conductive lands and the piezoelectric elements, the flexible members being of a stepped configuration to mechanically decouple the piezoelectric elements from the carrier structure; and
    an insulating layer deposited on the conducting lands and the flexible members.

12. An electrical circuit assembly comprising:
    a carrier structure for mounting as a single unit to a substrate, the carrier structure including an opening formed therein, a peripheral elevated portion, and a sloped portion between the elevated portion and the opening;
    at least one circuit element integrally formed with the carrier structure, such that the circuit element is located in the opening;
    a conductive land patterned on the carrier structure;
    at least one conductive flexible member electrically interconnecting the conducting land and the circuit element, the flexible member being of a zigzag configuration on the sloped portion to mechanically decouple the circuit element from the carrier structure; and
    a bond interconnecting the circuit element with the substrate.

13. The electrical circuit assembly as defined in claim 12 wherein the carrier structure is connected to the substrate by a glass bond.

14. The electrical circuit assembly as defined in claim 12 wherein the carrier structure includes foot portions connected to the substrate by a glass bond.

15. The electrical circuit assembly as defined in claim 12 wherein the conducting land formed and the flexible member include an insulating material deposited thereon.

16. The electrical circuit assembly as defined in claim 12 wherein the conducting land and flexible member include insulating layers on opposite surfaces thereof.

17. The electrical circuit assembly as defined in claim 12 wherein the flexible member is on the sloped portion.

18. A transducer assembly comprising:
    a carrier structure for mounting as a single unit to a substrate, the carrier structure including a window formed therein, a peripheral elevated portion, and a sloped portion between the elevated portion and the window;
    multiple piezoelectric members integrally formed with the carrier structure, such that the piezoelectric members are located in the window while maintaining electrical contact and a precise position relative to the structure by use of thin film, electrically conductive, metallic flexible members attached to both the carrier structure and the piezoelectric members;

conducting lands patterned on the carrier structure, the metallic flexible members electrically interconnecting the conducting lands and the piezoelectric members, the flexible members being of a stepped configuration to mechanically decouple the piezoelectric members from the carrier structure;

an insulating layer deposited on the conducting lands and the flexible members; and a glass frit bond interconnecting each of the piezoelectric members with the substrate.

19. The transducer assembly as defined in claim 18 wherein the carrier structure is connected to the substrate by a glass frit bond.

20. The transducer assembly as defined in claim 18 wherein the conducting lands and flexible members include an insulating material deposited thereon.

* * * * *